United States Patent [19]

van Noort

[11] Patent Number: 5,620,730
[45] Date of Patent: Apr. 15, 1997

[54] METHOD OF ENHANCING SHELF-STABILITY OF AN EDIBLE BIOLOGICAL PRODUCT

[76] Inventor: Gerard van Noort, 11 Krige Street, Stellenbosch 7600, South Africa

[21] Appl. No.: 302,509

[22] Filed: Sep. 8, 1994

[30] Foreign Application Priority Data

Sep. 9, 1993 [ZA] South Africa ............... 93/6664

[51] Int. Cl.$^6$ .................................................. B65B 31/00
[52] U.S. Cl. ................ 426/399; 426/393; 426/419; 426/509; 426/519; 435/259; 241/2
[58] Field of Search ........................ 426/231, 519, 426/399, 393, 419, 509, 615; 241/2, 24, 29, 24.1; 435/259

[56] References Cited

U.S. PATENT DOCUMENTS

| | | | |
|---|---|---|---|
| 2,037,029 | 4/1936 | Knowles | 99/1 |
| 3,556,414 | 1/1971 | Eberly, Jr. | 241/2 X |
| 3,679,139 | 7/1972 | Schneyour et al. | 241/2 |
| 3,939,066 | 2/1976 | Bauer | 241/2 X |
| 4,379,796 | 4/1983 | Gross | 426/486 |
| 4,407,840 | 10/1983 | Lathrop et al. | 426/629 |
| 4,476,225 | 10/1984 | Grigorian et al. | 241/2 X |
| 4,670,275 | 6/1987 | Orr et al. | 426/270 |
| 4,808,420 | 2/1989 | Springler et al. | 426/106 |
| 4,841,850 | 6/1989 | Friedmann | 99/472 |
| 4,855,153 | 8/1989 | Orr et al. | 426/270 |
| 4,865,861 | 9/1989 | Friedmann | 426/486 |
| 4,919,948 | 4/1990 | Orr et al. | 426/106 |
| 4,934,608 | 6/1990 | Sylla et al. | 241/1 |
| 5,188,856 | 2/1993 | Hinz et al. | 426/465 |
| 5,306,637 | 4/1994 | Lin et al. | 435/259 |
| 5,330,913 | 7/1994 | Nakayama | 435/259 |

FOREIGN PATENT DOCUMENTS

| | | | |
|---|---|---|---|
| 637018 | 6/1992 | Australia. | |
| 2677851 | 12/1992 | France. | |
| 2918212 | 11/1980 | Germany | 435/259 |
| 3417125 | 11/1985 | Germany. | |
| 4037499 | 5/1992 | Germany. | |
| 0126782 | 7/1983 | Japan | 435/259 |
| 87/7180 | 9/1987 | South Africa. | |
| 945127 | 12/1963 | United Kingdom | 241/2 |

OTHER PUBLICATIONS

Abstract of Japanese Patent No. JP–A–40 79870.
Abstract of Japanese Patent No. JP–05 076 329.
APV Gaulin GmbH Lübeck. "APV Gaulin Pascalisator," sheets 1–4 (article).

*Primary Examiner*—Milton Cano
*Attorney, Agent, or Firm*—Ladas & Parry

[57] ABSTRACT

The shelf-stability of carrot root material is enhanced by blanching the material, milling it, and then subjecting it to a decreasing pressure which is sufficiently rapid to cause rupturing of the cell walls of contaminating organisms in the product. The latter is effected by passing the product through a homogenizing valve (20). The treated product is then packaged by an aseptic packaging machine (22), to keep it from re-contamination by contaminating organisms.

8 Claims, 1 Drawing Sheet

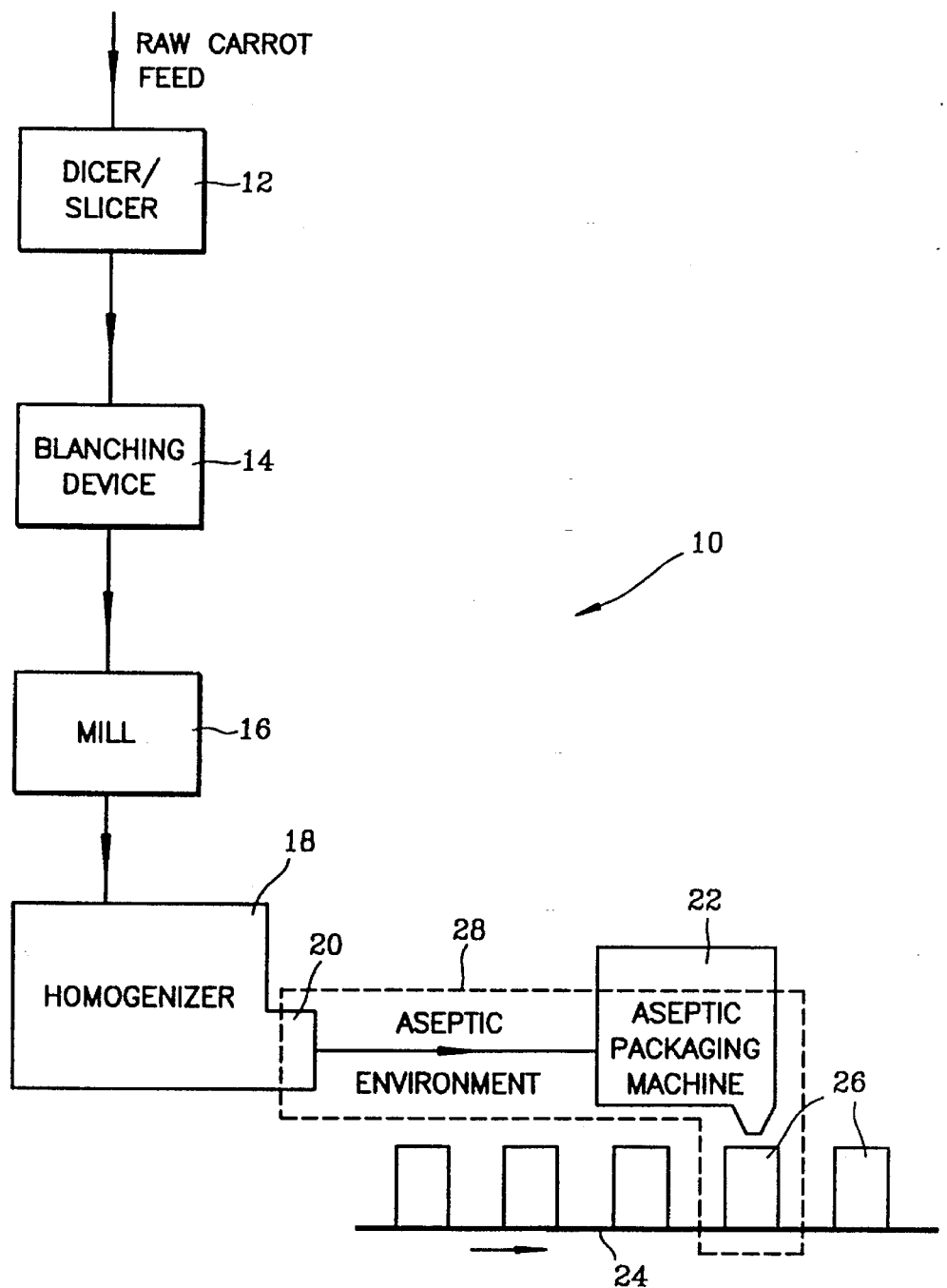

METHOD OF ENHANCING SHELF-STABILITY OF AN EDIBLE BIOLOGICAL PRODUCT

FIELD OF THE INVENTION

THIS INVENTION relates to a method of, and apparatus for, enhancing the shelf-stability of a biological product.

SUMMARY OF THE INVENTION

According to the invention there is provided a method of enhancing the shelf-stability of a biological product, which comprises subjecting the product to a decreasing pressure which is sufficiently rapid to cause rupturing of the cell walls of contaminating organisms in the product, and thereafter keeping the product from recontamination by such organisms.

The product may be subjected to said decreasing pressure by passing it through a homogenizing valve in which the pressure changes rapidly from at least about 400 bar down to atmospheric pressure.

The cellular burst technique utilized (ie the rapid reduction in pressure), in addition to diminishing or destroying altogether the viability of the contaminating organisms in the product, also causes rupturing of the cell walls of the biological product itself, and this has the effect of inactivating or otherwise controlling certain biochemical and non-biochemical reactions that are supported by intact cells of the product and that cause quality degradation and other undesirable changes in the product.

The product may be blanched prior to its being subjected to said rapidly decreasing pressure.

The blanched product may be milled prior to its being subjected to said rapidly decreasing pressure.

The product may be kept from re-contamination by a process selected from the group of processes consisting of: packaging the product under aseptic conditions in aseptic packaging; freezing the product and keeping it in a frozen condition; and drying the product and packaging the dried product in moisture impermeable packaging.

The product may be a vegetable product, and more particularly a carotene rich vegetable product. The product may be carrot root material.

Further according to the invention there is provided apparatus for enhancing the shelf-stability of a biological product, which apparatus comprises treatment means for subjecting the product to a decreasing pressure which is sufficiently rapid to cause rupturing of the cell walls of contaminating organisms in the product, thereby to provide a treated product, and post-treatment means for turning the treated product under aseptic conditions into a condition in which it is protected against re-contamination by such organisms.

The treatment means comprises a homogenizer including a homogenizing valve.

The post-treatment means may be selected from the group consisting of: aseptic packaging apparatus for packaging the treated product in aseptic packaging; refrigeration apparatus for freezing the treated product; and drying apparatus for drying the treated product and packaging the dried product in moisture impermeable packaging.

The apparatus may further comprise pre-treatment means upstream of the treatment means, the pre-treatment means including blanching means for blanching the product prior to its being subjected to said rapidly decreasing pressure. The pre-treatment means may further comprise a mill for milling the blanched product prior to its being subjected to said rapidly decreasing pressure.

BRIEF DESCRIPTION OF THE DRAWINGS

The invention will now be described in more detail, by way of example, with reference later to the accompanying drawing which is a block diagram of apparatus in accordance with the invention for enhancing the shelf-stability of a biological product.

DETAILED DESCRIPTION OF PREFERRED EMBODIMENT

The following is a non-limiting example of the method of the invention.

EXAMPLE

Carrot (daucus carota) root material was cleaned, washed, and sliced to provide pieces of approximately 25 mm×25 mm×25 mm in size. The material was then blanched in boiling water for 15 to 20 minutes for the purpose of softening the material, controlling the bacterial load, and inactivating enzyme systems that have a negative effect on the shelf-stability of the end product. At this stage the product should have a relatively large particle size so that, whilst heat penetration can take place, there is relatively little water penetration. This procedure has the effect of reducing biological activity in the end product, which may lead to undesirable gas generation.

The material was then milled to comminute it further, and was thereafter subjected to a cell burst procedure. In the cell burst procedure the material was first de-aerated to remove as much air or other gases in the material as possible. It was then fed to the intake of a high pressure pump which increased the pressure in the material to up to 1000 bar. The material was released from the discharge of the pump back to essentially atmospheric pressure, the resultant sudden reduction in pressure causing the cell walls of the material and also of any microbial cells in the material to rupture.

From the pump the material was conveyed under aseptic conditions to an aseptic packaging machine, where it was packaged in aseptic packaging.

Turning now to the drawing, reference numeral 10 generally indicates apparatus for processing and packaging a biological product, and more particularly carrot root material. The apparatus comprises a dicer or slicer 12, a blanching device 14, a mill 16, and a homogenizer 18. The homogenizer 18 has a homogenizing valve 20 which feeds into an aseptic packaging machine 22. The aseptic packaging machine 22 forms part of a packaging line which includes a conveyor 24 whereby aseptic packaging sachets, bags, or other containers 26 are conveyed past the filler nozzle of the aseptic packaging machine. The region from the homogenizing valve 20 to the aseptic packaging machine 22, as indicated by the dotted line 28 is maintained in an aseptic condition.

Homogenizing machines are known in the art. The homogenizing valve in these machines usually comprises a spring-loaded ball element which seats on a valve seat. When product is forced through the valve the pressure unseats the ball element and the product squeezed through the narrow annular gap that forms between the ball element and the valve seat as the ball element is unseated. In addition to the rapid decrease in pressure which the product undergoes when passing through the valve, the surfaces of the valve where the product passes through the annular gap have a shearing effect on the cells of the product and of contaminating organisms in the product. This is believed to assist in rupturing the cell walls of the product and any contaminating organisms in the product.

I claim:

1. In a method of processing an edible biological product containing contaminating organisms wherein the product is subjected to a pressure change sufficient to cause rupture of cell walls of the product, said product then being exposed to an atmosphere containing contaminating organisms after exposure to said pressure change, the improvement comprising: enhancing a shelf-stability of said product by passing said product through a homogenizing valve so as to subject the contaminating organisms in said product to an increasing pressure and then to a pressure decrease sufficient to cause rupturing of cell walls of substantially all of the contaminating organisms in said product, and thereafter immediately placing said product under aseptic conditions and maintaining said product under said conditions for aseptic packaging to thereby prevent re-contamination of said product by said contaminating organisms in said atmosphere.

2. A method according to claim 1, wherein the pressure changes from at least about 400 bar down to atmospheric pressure.

3. A method according to claim 1, wherein the product is blanched prior to passing said product through the homogenizing valve.

4. A method according to claim 3, wherein the blanched product is milled prior to passing said product through the homogenizing valve.

5. A method according to claim 1, wherein the product is kept from re-contamination by a process selected from the group consisting of: freezing the product and keeping it in a frozen condition; and drying the product and packaging the dried product in moisture impermeable packaging.

6. A method according to claim 1, wherein the product is a vegetable product.

7. A method according to claim 6, wherein the product is a carotene rich vegetable product.

8. A method according to claim 6, wherein the product is carrot root material.

* * * * *